United States Patent Office 3,715,158
Patented Feb. 6, 1973

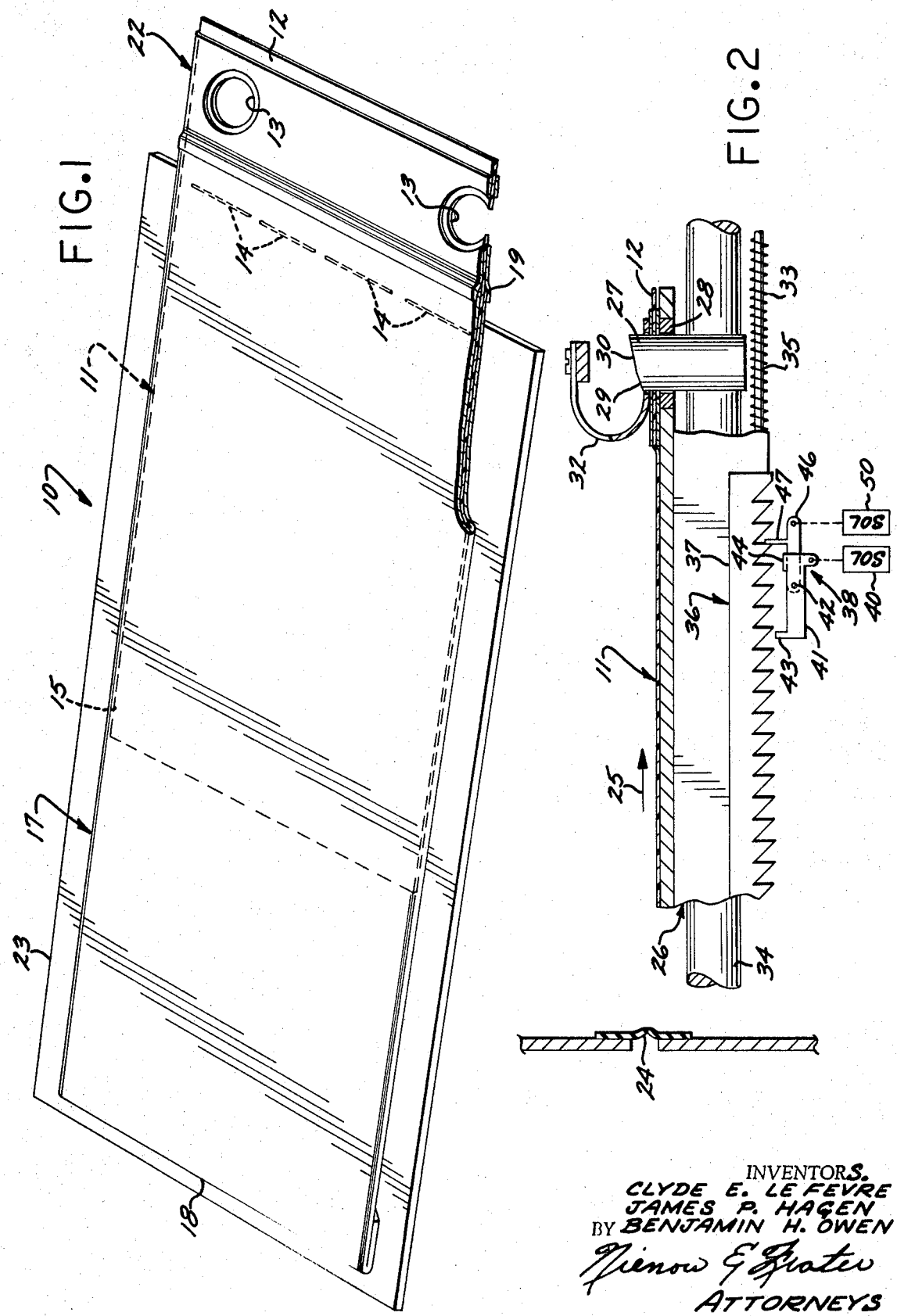

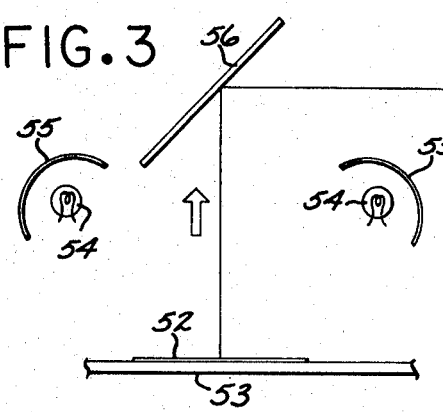
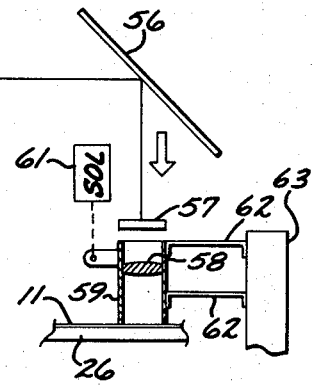
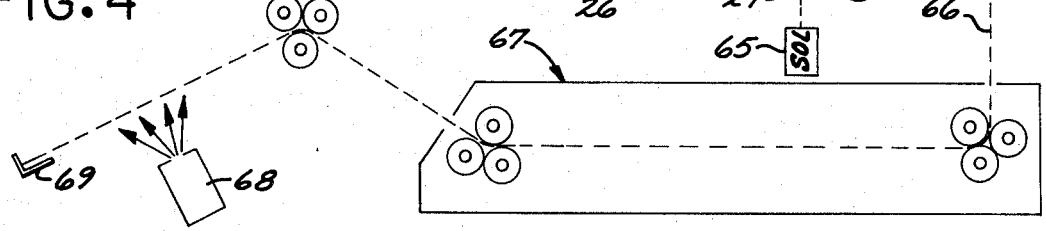
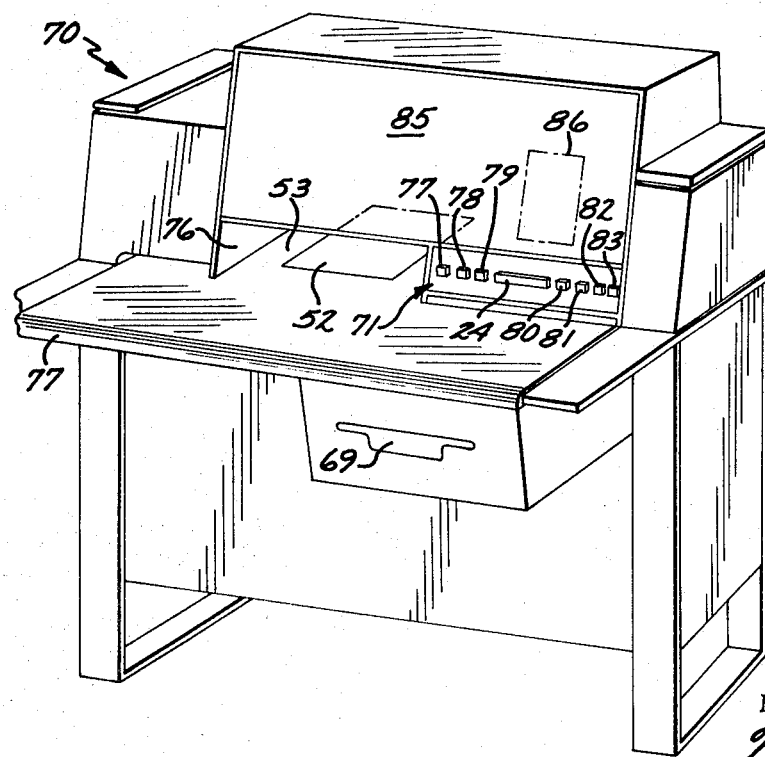
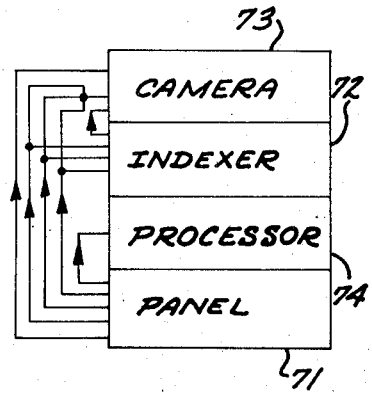

3,715,158
MICROFICHE CAMERA PROCESSOR
Clyde E. Le Fevre, Orange, James P. Hagan, Laguna Beach, and Ben H. Owens, Orange, Calif., assignors to Micrographic Technology Corporation, Santa Ana, Calif.
Filed Apr. 19, 1971, Ser. No. 135,180
Int. Cl. G03c 27/52
U.S. Cl. 355—27                              5 Claims

ABSTRACT OF THE DISCLOSURE

Apparatus for producing a microfiche using a single sheet film pack of photographic film; the film pack comprising a protective cover to prevent exposure of the film sheet to ambient light so that the film pack may therefore be handled without fear of premature exposure. The film pack is inserted into a dark chamber of the disclosed apparatus; and the protective cover is then removed. The photographic film sheet is now optically exposed to produce reduced size images of data to be recorded; an indexing arrangement being used to remove the film sheet to various locations in accordance with the desired microfiche format. When the film sheet has had its various areas exposed, it is then processed; and the disclosed apparatus delivers a dry finished microfiche in a few moments.

BACKGROUND

It is well recognized that our civilization is in the midst of a "knowledge explosion"; new knowledge being accumulated so fast that it is becoming progressively more difficult to store the new information. It therefore becomes quite important to provide a "data compaction" system for data storage, and for data retrieval; and one of the widest used of such systems that is known as "microfilming." In this system, a standard 8½ inch by 11 inch sheet of paper containing information of any type (typed, handwritten, drawn, etc.) is optically and photographially reduced in size to a "micro-frame" that has typical dimensions of about 0.4 inch by 0.5 inch. This is a size reduction of about twenty to one; some of the other microfilming systems using a size reduction of about forty-two to one. A plurality of such micro-frames are then arranged on a 4 inch by 6 inch "microfiche"; the most common microfiche arrangement being a rectangular format having about seven rows and fourteen columns, to hold about ninety-eight micro-frames. Other systems use different layout formats.

It may thus be seen that the microfilming technique quickly compacts the data; and provides a microfiche of standard size and shape that permits easier data storing, easier data retrieval, etc.

Data retrieval from the microfiche may be readily accomplished by using a suitable optical system to enlarge the particular desired micro-frame; a "hard" copy of the micro-frame being printed, if so desired.

One of the major problems of prior art microfilming apparatus was the difficulty of handling the raw, unexposed film onto which the data is to be photographed. Most prior art apparatus required the use of a darkroom for loading and unloading the film. Other prior art apparatus used rolls of film, which then had to be cut to suitable size. Furthermore, none of the prior art microfilming apparatus had a short-time developing unit; and all of them were quite expensive.

SYNOPSIS

Broadly stated, the disclosed microfiche processor uses a single sheet film pack that has a lightproof protective cover for protecting the photographic film sheet from ambient light. The front end of the film pack is inserted through a film slot into the dark chamber of the apparatus; registry holes of the film pack being "captured" by registry pins of a film carriage. At this time a gentle tugging of the film pack end that still projects outside of the film slot removes the protective cover; and the film sheet is now ready to receive photographic images corresponding to the data on copy sheets. The film carriage, and its now associated film sheet, is "indexed" to different locations for receiving subsequent such images. When the film sheet is filled with such images, it is removed from the film carriage while still in the dark chamber; and is transported to a film developing unit that develops the images on the film sheet. When this has been accomplished, the finished microfiche is deposited in an external output receptacle.

OBJECTS AND DRAWINGS

It is therefore the principal object of the present invention to provide an approved microfiche producing apparatus.

It is another object of the present invention to provide an improved microfiche producing apparatus that requires only a very short time interval.

It is still another object of the present invention to provide an improved microfiche producing apparatus that is compact, simple and easy to manufacture.

It is a further object of the present invention to provide an improved microfiche producing apparatus that does not require the use of a dark room.

It is a still further object of the present invention to provide an improved microfiche producing apparatus that utilizes a single sheet film pack.

The attainment of these objects and others will be realized from a study of the following detailed description, taken into conjunction with the drawings, of which:

FIG. 1 shows a pictorial partially cutaway view of the film pack;

FIG. 2 shows a schematic view of a ratchet mechanism for providing indexing movement;

FIG. 3 shows a schematic view of the optical arrangement;

FIG. 4 shows a schematic view of the processing of the film;

FIG. 5 shows a schematic view of the electrical arrangement; and

FIG. 6 shows a pictorial view of the cabinet that houses the equipment.

DESCRIPTION

To facilitate the understanding of the disclosed invention, the following description will be presented in terms of electric apparatus that uses electric components (such as switches, solenoids, plungers, etc.); but it should be kept in mind that equivalent mechanical devices may often be substituted for the electric components mentioned.

The film pack

The operation of the present invention will be best understood by first referring to FIG. 1, which shows a "film pack" 10 that comprises a sheet 11 of raw unexposed photographic film stock, onto which the data is to be photographed in reduced size. The film sheet 11 has a tab portion 12 containing one or more registry holes 13, whose function will be discussed later, two such registry holes being shown in the illustration. Film sheet 11 also comprises a row of perforations 14 that separate tab portion 12 from a body portion 15; the function of these perforations also will be discussed later.

It will be recalled that film sheet 11 comprises a raw unexposed film that will produce photographic images of data when suitably exposed; so that the film sheet 11 must be protected from ambient light; and, as indicated above, this was one of the major problems of prior art apparatus.

In the disclosed invention, as indicated in FIG. 1, the raw unexposed body portion 15 of the film sheet 11 has at least one of its surfaces protected by a lightproof protective cover; the cover in FIG. 1 taking the form of a light tight envelope 17 that is formed by wrapping the envelope material around the raw film sheet 11. The lower end 18 of the envelope 17 is suitably closed in a light tight manner, as by being folded over itself; and the longitudinal edges of the envelope are sealed in an overlapping relation (not visible in FIG. 1).

The upper end 19 of envelope 17 may have its transverse edges affixed to the tab portion 12 of the film sheet 11; the affixing being accomplished, for example, by an adhesive that has only a fair holding strength or, alternatively, by using only a few dabs of adhesive between the upper end 19 of envelope 17 and the tab portion 12 of film sheet 11. Thus, the upper end of envelope 17 is attached in a "break away" manner; and can be readily freed from the film sheet 11 by tugging at its lower end, whenever it becomes desirable to do this. The reason for this relatively weak break away attachment will be discussed later.

In this way, the raw film strip 11 is enclosed in a lightproof envelope 17 that can be easily removed when desired, but is meanwhile protected against ambient light during handling and storage.

FIG. 1 indicates that the film strip 11 has a reinforcing handle 22 that is wrapped around the tab portion 12 of the film sheet 11; reinforcing handle 22 preferably being of a strong paper and being firmly attached to the film tabe 12, by means such as an adhesive having a good holding strength.

It will be noted that there is preferably an overlap between the upper end 19 of enclosing envelope 17 and the lower end 21 of the reinforcing handle 22; this overlap assuring a lightproof enclosure, and providing additional handling strength, as will become apparent from a subsequent discussion.

A particularly good construction results from making the reinforcing handle 22 of a tape that has a strong pressure sensitive adhesive at its upper edge, and has spots of adhesive at its lower edge, this arrangement providing a strongly attached handle at the tab portion 12, and a relatively weak break away attachment at the upper end 19 of the protective envelope 17.

An alternative film pack construction is to use, instead of an enclosing envelope 17, a strip of protective material that is attached in a break away manner around the periphery of the film sheet. This construction will also provide the desired lightproofing; and may be easily removed by tugging.

It has been found advisable to affix a length of cardboard 23 to the bottom portion of the envelope 17 for additional strength, and for another purpose that will be discussed later.

In summarizing the film pack, it may be stated that at least one photosensitive surface of a single sheet of raw film is protected by a lightproof protective cover, so that the film pack may be easily stored; and then handled and used as needed.

The film carriage

As discussed in connection with FIG. 1, the raw film sheet 11 must photographically record the data in a microframes area; and successive micro-frame areas must be carefully positioned relative to each other in a given microfiche format. In order to accomplish this positioning, the present invention places the film sheet 11 of FIG. 1 on a film carriage; and then "indexes" (positions) the film carrier, and thus the film sheet, in the desired manner.

The indexing procedure will be better understood from FIG. 2. In this illustration it will be assumed, for reasons that will be discussed later, that the film carriage 26 is properly positioned; and that the film pack has been fed, tab portion first, from the left side of the illustration through a light baffled film slot 24 into the dark chamber of the apparatus. As the tab portion is fed forward (that is to the right) it slides "forward" in the direction of arrow 25 onto the upper surface of film carriage 26. Further forward movement of the film pack causes the tab portion to abut the rear of one or more registry pins such as 27 that are normally biased or spring loaded to their upper positions. The registry pins 27 are preferably cylindrical in cross section; and are adapted to move vertically on suitable guides or bearing 28 in the film carriage 26.

Still further forward movement of the tab portion 12 causes the extreme front end thereof to ride up pin ramps 29 and 30; and over the top of the registry pins 27—the ramps 29 and 30 assisting the forward and upward movement of the front end of tab portion 12.

In order to make the registry pins 27 fit into "register" with the registry holes 13 of tab portion 12 (see FIG. 1), hold down springs 32 may take the form of two pronged forks that push down on the tab portion 12 adjacent the registry holes 13. This way the registry pins 27 fit into, and engage, the registry holes 13; thus "capturing" the film sheet 11, and holding it to the surface of the film carriage 26. If course, the number, size, and location of the registry holes must correspond to the number, size and location of the corresponding registry pins.

Best results are obtained when the pin ramp 29 has an effective cross sectional area that is about twenty-five percent of the effective cross sectional area of the entire registry pin 27; so that the peripheral engagement between registry pins 27 and the registry holes 13 is at least about seventy-five percent.

It has been found that after the film pack 10 has been inserted into the film slot 24, it tends to buckle when the leading edge thereof is pressed against registry pins 27; but this problem may be solved in a number of ways. For example, restraining longitudinal guides may be incorporated to prevent this buckling; but it has been deemed advisable to attach the disclosed backing 23 of FIG. 1, which may be made of cardboard, as this prevents buckling, and provides additional strength to the film pack during storage, handling and the like.

In summary to this point, the film pack of FIG. 1 has been pushed through the film slot 24 into the apparatus dark chamber, until the registry holes 13 have been engaged by the registry pins 27 of the film carriage 26; and the film tab 12 is being held in this position by film hold down spring 32, and by the snug fit of the registry pins and the registry holes.

It will be recognized that up to this time the photo sensitive surface of the film sheet 11 has been protected from the ambient light by a protective cover or envelope 17; so that despite handling, storage, etc., no dark room has been required. Now that the film sheet 11 is in the dark chamber of the disclosed apparatus, the protective lightproof cover may now be removed; and this removal is accomplished as follows.

The protective cover 17 has the suitable length so that a good bit of it extends beyond the film slot 24 without having ever entered the dark chamber, even though the tab portion 12 has been captured by the film carriage. The protective cover 17 may now be removed by gently tugging at its exposed lower end, which is still outside the apparatus; and the effect of the tugging is to cause the protective cover 17 to break loose at its breakaway attachment. The operator thereupon withdraws the separated lower portion of the envelope; leaving the raw unexposed film sheet 11 on the film carriage 26 as indicated in FIG. 2, this breakaway action taking place in the dark photographic chamber of the apparatus.

Thus, the raw unexposed film sheet 11 has now been positioned on the film carriage 26; and is ready to be indexed and exposed as desired.

Indexing

It will be recalled that there is a standardized microfiche format; and to form this, a first row of fourteen micro-frames should be produced, followed by a second row of micro-frames; followed by a third row, etc. In order for the disclosed apparatus to achieve this positioning sequence, it becomes necessary to move (index) the film carriage 26 (and the associated film sheet thereon) a definite distance in a given direction; and this result may be accomplished by the indexing mechanism indicated in FIG. 2.

Film carriage 26 is indicated to be moveable along a suitable guide bar 34, the forward movement to the right is produced by the influence of a spring 33 and cable 35; the movement being controlled by a ratchet mechanism 36 comprising a ratchet bar 37 and a double pawl arrangement 38.

The indexing operation is as follows: When the film carriage 26 is to be moved one step to the right, a first panel button marked SPACE is momentarily activated to activate a first solenoid 40; the well-known solenoid magnetic action causing its armature to retract longitudinally into the solenoid. A mechanical linkage (indicated by the dotted line) is attached to the solenoid armature; this mechanical linkage being connected to one end of a first class type of lever that comprises a first pawl lever 41 rotatable mounted on a pivot 42. Thus, the activated solenoid rotates the first pawl lever 41 in a clockwise direction around pivot 42, producing two simultaneous results. The first result is that a first pawl pin 43, associated with pawl lever 41, is advanced toward the ratchet bar 37; so that the first pawl pin 43 is ready to engage a tooth of the ratchet bar 37. The second simultaneous result is that the offset 44 of the first pawl lever 41 pulls down the second pawl lever 46; so that the second pawl lever 46 also rotates clockwise around pivot 42, and a second pawl pin 47 associated with the second pawl lever 46, disengages from the tooth of the ratchet bar 37.

Therefore, the film carriage 26 moves to the right until the now upwardly raised first pawl pin 43 of the first pawl lever 41 engages the approaching tooth of the ratchet bar 37; and this pin/tooth engagement stops the rightward movement of the film carriage 26. However, as soon as solenoid 40 is deactivated, as by releasing the SPACE panel button, the pawl lever 41 returns to the position illustrated; and the second pawl pin 47 of the second pawl lever 46 is now raised to engage the approaching ratchet bar tooth; and this pin/tooth engagement stops the film carriage 26 exactly one tooth rightward of its previous position.

Thus, alternatively engaging/disengaging of the two pawl pins provides a step like forward indexing movement of the film carriage 26.

It should be noted that only the ratchet bar 37 need be of close tolerance workmanship; the other parts of the ratchet mechanism may be of ordinary tolerances.

The double pawl ratchet mechanism 36 has the following inherent advantage. There are times when it is desirable to be able to skip selected micro-frame positions; this situation arising, for example, when the data for those locations is not yet available, etc. Under these conditions, the SPACE panel button is depressed as often as necessary; each such depressing operation causing the film carriage 26 to advance, or skip, one position in a forward direction.

There are times when a given row of the film sheet is to be only partially filled with micro-frames; as, for example, when a given set of data requires a plurality of, but not all, the film sheet spaces available. When all the desired spaces of a given row have been used, it is now desirable to advance the film carriage to its final position of that row; this is accomplished by means of a CARRIAGE RETURN panel button that activates only solenoid 50; the action of solenoid 50 being to pull down only the second pawl lever 46. This lever now rotates clockwise to disengage the second pawl pin 47 from the ratchet bar 37, without engaging the first pawl pin 43; so that the film carriage 26 now moves, due to the action of cable 35, forward to its extreme righthand position.

Thus, simultaneously disengaging both of the pawl pins provides continuous forward movement of the film carriage 26.

When the film carriage 26 has been advanced to its extreme righthand location of that row, the film carriage 26, or one of its component parts, activates an electrical positioning switch (omitted for clarity of illustration); and this positioning switch causes a similar, transversely acting ratchet mechanism, to move the entire film carriage 26 sidewise.

The positioning switch simultaneously causes a motor system to move the film carriage 26 to its extreme leftmost position, in order to rewind the spring, and to position the film carriage 26 so that the first micro-frame of the second row of the microfiche format may now be formed. The above procedure, of course, permits the forming of the next row of micro-frames.

The new row positioning is automatically performed as each time the film carriage 26 reaches the end of a given row, so that the film carriage 26 eventually arrives at its final position of the microfiche format.

While the above discussed positioning switches cause the film carriage 26 to assume its final position in a row-by-row manner, the same final position may be achieved by a CARRIAGE ADVANCE panel button; although it is desirable that the CARRIAGE ADVANCE panel button disable the motor system that normally produces leftward movement of the film carriage, so that the final carriage position is obtained directly, rather than by the row-by-row technique.

It should be noted that by judicious use of positioning switches, ratchet bars, and the like, other desired formats may be achieved.

While on the subjet of indexing, it will be realized that when all of the film sheet spaces have been used, it is necessary to remove the film sheet (which will be discussed later); and to return the film carriage 26 to its starting position, in which it will accept another film pack inserted through the film slot 24. This repositioning of the film carriage to its starting position can be achieved by a panel button marked PROCESS, which among other functions activates the motor system; and this panel button preferably activates solenoid 50 to disengage the second pawl pin 47, in order to minimize ratchet mechanism wear.

Thus, simultaneously disengaging both of the pawl pins and energizing the motor system, provides continuous rearward movement of the film carriage 26.

It will be realized that, as discussed above, the film carriage 26 requires two carriage return motors to return it to longitudinal and transverse starting position; but it has been found preferable to use a single motor with separately engageable clutches, and to use the motor only when needed, rather than to use two separate continuously running motors. This will be discussed later.

The camera

It was pointed out above that the microfilming technique requires that sheets of data be photographically recorded on a microfiche as reduced size micro-frames; and the foregoing description of the disclosed apparatus has explained how a single sheet 11 of raw film stock is placed on a film carriage 26, and how the film carriage 26 is indexed to different positions so that the resulted microframes will provide the desired microfiche format. The following discussion will relate to the forming of the micro-frames; and this will be done with reference to FIG. 3.

In this illustration, the original document 52 to be recorded as a micro-frame, is placed on a copy platform 53; and one or more sources of illumination 54, which may have directional reflectors 55, are turned on to facilitate the proper placement, orientation, and photographing of the copy sheet 52. The light that is reflected from the original document 52 follows the optical path indicated by the arrows to a light shutter 57. This optical path is determined primarily by mirrors 56, which are preferably of the front silvered type to minimize distortion. Mirrors 56 are preferably spaced as far apart as feasible, for reasons that will be discussed later.

Activation of a PRINT BUTTON opens shutter 57, and causes the light from the original document 52 to traverse the indicated optical path, and to finally impinge onto an optical system 58 positioned in a lens holder 59. The optical arrangement thus images the original 52 onto the indexed area of the raw film sheet 11, which is resting on the film carriage 26 that has been indexed as described above.

In this way, a latent image of a micro-frame corresponding to the original document 52 is produced on the film sheet 11; the described optical arrangement thus functioning as a camera.

It will be realized that the optical spacing is very important to the production of a high quality microframe; and in order to provide optimal results, the lens holder 59 is such that its periphery actually rests on the film sheet 11 during the photographing interval. Thus, the lens to film distance is carefully controlled; and is always constant for each photographic operation.

The physical resting of the lens holder 59 on the film sheet 11 is one of the main reasons for using a motor that operates only during the indexing movement, and is non-operative during the photography interval, as may be understood from the following discussion. The production of high quality micro-frames requires precise, constant spacing between the film sheet 11 and the optical system 58 positioned in lens holder 59; and it has been found that vibrations from a constantly operating motor varies this spacing; and degrades the quality of the microframe. Therefore, the preferred arrangement is to operate the motor only when it is used for indexing.

It has been found advisable to make the periphery of the lens holder 59 substantially the same size and shape as the periphery of the micro-frame— so that even though the lens holder 59 rests lightly on the film sheet 11, resultant marks, if any, are outboard from the recorded data of the micro-frame.

When it is desired to produce subsequent micro-frame latent image at another location of the film sheet, a new document 52 is placed on the copy platform 53; and the film carriage 26 is now indexed as described above. However, it should be recalled that the lens holder 59 is now physically resting on the film sheet 11. With this resting feature now in mind, it should also be recalled that an indexing operation is initiated by pressing the panel button marked SPACE, CARRIAGE ADVANCE, or CARRIAGE RETURN. Therefore, these buttons also activate apparatus, such as a solenoid 61, that momentarily raises the lens holder 59 off the film sheet 11; so that the film sheet 11 is now free to move, without being impeded or scratched by the now raised lens holder 59. When the panel button is released, solenoid 61 is de-activated; and the lens holder dropped to again rest on the film sheet 11.

A slight alignment problem may arise as a result of indexing the film carriage 26; and this problem will be understood from the following discussion.

It was previously indicated that the film carriage 26 moves along guide bars; and if the film carriage 26 and its guide bars are made to extremely close tolerances, and are made of minimal wear materials, the top surface of the film carriage 26 will always remain in substantially the same plane, regardless of the location of the film carriage as it is indexed to its various locations, and regardless of the amount of use the apparatus has experienced. This ideal condition, however, requires extremely costly workmanship and materials.

If lower tolerance workmanship and/or inferior materials are used, it may happen that the top surface of film carriage 26 assumes different planes as the film carriage is indexed to various locations.

These different planes may be deleterious to the maintenance of a high quality micro-frame images; because it is important that the optical system 58 maintain a perpendicular orientation to the film sheet 11. The loss of this perpendicular orientation may be understood by imagining that the lens holder 59 is mounted at the end of a horizontal arm; so that the lens holder 59 may be lifted from, and then lowered to, the surface of the film sheet 11 for producing a new micro-frame. If it should happen that the film carriage 26 were to assume a slightly lower or higher plane after being indexed, it is apparent that due to the horizontal arm mounting the lens holder 59 would now rest on the film sheet 11 at a slight angle; and this angle to the desired perpendicular orientation would introduce optical distortion.

If, on the other hand, the lens holder 59 were to slide vertically in a mounting, this sliding arrangement would introduce the possibility of wear and binding.

In order to solve the above problem, it has been found advantageous to mount the lens holder 59 by means of parallel springs 62 that are affixed to a spring mount 63. Now, when the lens holder 59 rises or descends relative to the film sheet 11, the lens holder 59 and the parallel springs 62 act like a parallelogram arrangement that cause the lens holder 59 to remain in a substantially vertical orientation at all times, even while it is suspended in mid-air.

When the lens holder 59 is lowered to the surface of the film sheet 11, the lens holder/parallel spring arrangement causes the lens holder 59 to maintain its vertical orientation, regardless of the actual height of the film carriage 26. Thus, the lens holder 59 and its optical system 58 are always perpendicular to, and properly spaced from, the film sheet 11.

It will be recalled that a previous discussion indicated that the mirrors 56 are preferably spaced apart as widely as possible; this wide spacing provided the following advantage. The farther that the document 52 is from the optical system 58, the closer the impinging light approaches the approximation of light arriving in parallel rays from a source that is infinitely far away. This effect, taken in conjunction with the parallel spring arrangement, means that regardless of the actual height of the film carriage 26, the light from the copy sheet 52 always impinges onto optical system 58 in substantially parallel light rays, and at a substantially perpendicular orientation; and this arrangement improves and stabilizes the operation of the optical system.

The processor

The above discussion has indicated how a film sheet 11 may be prepared for photography, how high quality latent images of reduced size micro-frames of data sheets may be produced on the film sheet 11; and how successive micro-frames may be positioned to form a desired array of images on film sheet 11. Once the above procedures have been performed; it then becomes necessary to process, or develop, the plurality of micro-frame latent images on the film sheet 11.

It will be recalled that when the desired format of micro-frames has been achieved, the film sheet 11 (and the film carriage 26 on which it is resting) are in their final position. In order to develop the micro-frame latent images into visible micro-frames, the necessary developing processing is initiated by pressing a panel button marked PROCESS. This action causes the film carriage 26 to be positioned in such a manner that the forward end of the tab portion 12 of the film sheet 11 is positioned between a pair of transport rollers 64, as indicated in FIG. 4; causing the registry pins 27 to be withdrawn downward (as by means of a solenoid 65); and causes a motor (not shown) to rotate the transport rollers 64, so that the film sheet 11 may now be pulled horizontally off the film carriage 26 on which it has rested.

The energization of the above mentioned transport roller motor causes rollers 64 to firmly grasp the leading edge of film sheet tab 12; and to move the entire film sheet 11 along the path indicated by the dotted line 66, suitable guide rollers or longitudinal edge guides being used as needed.

The now exposed film sheet 11 is fed into a film processor 67, which may be of any desired type, as for example, Model DD1437/Rapidoprint film processor may be the Agfa-Gevaret Co. of Teterboro, N.J. This particular film processor has the advantage of requiring only a small amount of liquid for development of the film, and of performing the photographic processing in about forty seconds. Therefore, by the use of this particular processor the film sheet 11 is quickly developed into a microfiche that emerges from the processor in a slightly damp condition. At this point, the slightly damp microfiche is dried off by means of warm air obtained from any suitable warm air source 68, which may be a fan blowing across a heater coil, a commercial warm air supply, or the like. In any event, a dry microfiche is deposited into an output tray 69.

Circuitry

FIG. 5 shows a schematic circuit of the major electrical interconnections associated with the disclosed apparatus. In this illustration, it will be seen that a control panel 71 would contain a plurality of the above discussed panel buttons or switches for controlling the above described operation related to the production of the microfische. Suitable electrical connections are indicated between the control panel 71 and the indexing portion 72 of the apparatus, for controlling the spacing of the film carriage the return of the film carriage to its starting position, the advance of the film carriage to its final position, etc. Other electrical connections are shown between the control panel 71 and the camera portion 73 of the apparatus; these connections being used for controlling the shutter, etc. Interconnections are shown between the indexer 72 and the camera portion 73 for raising and lowering the lens holder, etc., during movement the film carriage. An electrical connection is also indicated between the control panel 71 and the processor portion 74 of the apparatus; this connection controlling the state of the processor, the movement of the transport rollers, the operation of the dryer, etc.

The various internal connections have been omitted since their functions have been explained above.

The cabinet

FIG. 6 shows one form of cabinet 70 used for housing the disclosed invention; the cabinet comprising a housing supported on legs of a suitable length to place the working shelf 75 at a convenient height. The cabinet further comprises the light baffled film input slot 24 previously discussed, into which the film pack 10 is inserted as explained above in connection with FIGS. 1 and 2. The original document 52 is inserted through the working opening 76, to be placed on the copy platform 53 as described previously.

It is, of course, necessary for the document 52 to be properly placed and properly oriented; and this requires that the operator should be able to watch the copy sheet placement. Therefore, the working opening 76 was at first made quite large to permit this; but the large opening impaired the overall appearance of the equipment, so the following design was adopted.

The working opening 76 was made sufficiently large to permit easy paper insertion; and was then bordered with an appearance enhancing edging. The face 85 of the apparatus is made of a transparent glass coated with a thin film of dark material or is a piece of Plexiglas impregnated with dark coloring material. Since this material is black, the face glass 85 is ordinarily opaque when looking from a room where the ambient light level is high, into a space such as the interior of the apparatus where the light level is low. Therefore, the face glass 85 assumes a black, shiny, attractive appearance. However, when the operator turns on the illuminating source 54 of FIG. 3, and places the document 52 on the copy platform 53 the light level within the interior of the apparatus is now higher than the ambient light level in the room. The formerly opaque face glass 85 now becomes relatively transparent in the area of the copy platform 53, in the manner of a semi-transparent mirror; and the operator is now able to see whether the copy sheet 52 is properly oriented and placed.

If desired, a display area 86 may be provided for indicating the instantaneous location of the film carriage 26 and its associated film sheet 11; and the above described semi-transparent face glass 85 may be used to provide an attractive display. Rather than using marked wheels or the like to provide the display information, the display symbols may take the form of shaped sources of illumination as, for example, alphanumerical shaped sources of light. When these are projected onto the black surface of face glass 85, they cause the light level of their localized area to be higher than the light level of the ambient room illumination; and therefore the display symbols are visible as shaped characters on a black opaque face glass.

The operating process

As indicated in FIG. 6, a power panel button 77 turns on the power; and an indicator light 78 indicates whether the power has, in fact, been turned on.

To start the operation, the PROCESS panel button 79 is pushed; this clears the machine, and causes the indexing mechanism to position the film carriage at its starting position, as described above. Next, the film pack is inserted; and the envelope thereof removed. The PRINT panel button 80 is then depressed; and this action withdraws the shutter, so that a first micro-film image is formed. After the shutter closed, the film carriage automatically moves to the next image position.

At any time that it becomes desirable, the film carriage may be advanced in single steps to predetermined areas of the film sheet without the printing process by merely pressing the SPACE panel button 81.

A new row can be started by depressing the CARRIAGE RETURN button 82.

Anytime that it is desired to terminate the use of the particular film sheet in the machine, the operator merely pushes the CARRIAGE ADVANCE button 82; and the film carriage is automatically advanced to its final position.

When the film carriage is in its final position, activation of the PROCESS panel button 79 initiates the transportation of the film sheet to the film processor, and starts the film developing process, and returns the film carriage to its starting position. After a short time interval the finished dry mircofiche appears at the output receptacle 69. The PROCESS and CARRIAGE ADVANCE function can be combined into a single button.

It will be realized that when the developed microfiche is delivered to the output receptacle 69, it still comprises its tab portion 12. Now this tab portion can be torn off, at the perforations 14 (see FIG. 1), to produce a microfiche of the desired standard size for storing in standard microfiche filing cabinets, for feeding into standard microfiche data retrieval apparatus, etc.

SUMMARY

The disclosed microfiche producing apparatus has a number of advantages over prior art systems. First of all, it copies original data onto a film sheet, where it produces images corresponding to the data on the copy sheets; develops these images; dries the film sheet; and delivers the finished microfiche in a matter of minutes. Secondly, the original documents may comprise data in a number of forms, typewritten, longhand, sketched, printed, etc., and in almost any contrasting color. Thirdly, the disclosed apparatus may be used by general office personnel without specialized technical knowledge. Fourthly, the apparatus may be loaded and unloaded in ordinary office illumination, without taking any unusual precautions; thus eliminating the need for a darkroom. Fifthly, exposure time for each copy sheet is less than three seconds; and the processing time is about ninety seconds. Sixthly, the apparatus uses a novel film pack that may be handled and stored without danger of premature optical exposure. Seventhly, the microfiche format may be readily altered for different microfiche systems. And finally, the disclosed apparatus may be made of relatively low tolerance components.

What is claimed is:

1. A microfiche camera processor comprising:
   an enclosure;
   a positionable film carriage located within said enclosure;
   a film pack including an attachment portion, a sheet of photographic film, and a removable protective cover therefor;
   means for permitting said film pack to be inserted, attachment portion first, into said enclosure;
   means for attaching said attachment portion of said film pack to said positionable film carriage;
   whereby the removable protective cover may now be removed, leaving said film sheet unaffected by ambient light, and attached to said positionable film carriage for photographic exposure and development in said enclosure;
   means for indexing said film carriage and said film sheet to desired locations;
   camera means, comprising a lens holder positioned to rest on the surface of said film sheet, for producing photographic images on predetermined areas of said film sheet;
   means for lifting said lens holder off said film sheet during the time interval when said film sheet/film carriage is being indexed;
   film processor means for photographically developing said photographic images on said film sheet into a microfiche;
   means for transporting said film sheet from said film carriage to said film processor without being affected by ambient light;
   means for activating said film processor to develop said images on said film sheet for producing a microfiche;
   means for depositing said completed microfiche in an output receptacle.

2. The combination of claim 1 including means, comprising a parallel spring mounting arrangement, for maintaining said lens holder in a substantially perpendicular orientation relative to said film sheet during the rising and descending motion of said lens holder.

3. The combination of claim 2 wherein said indexing means comprises a double pawl ratchet mechanism having two pawl pins;
   means for alternately engaging/disengaging said two pawl pins for providing step like forward indexing movement of said film carriage;
   means for simultaneously disengaging both of said pawl pins for providing continuous forward movement of said film carriage;
   means for simultaneously disengaging both of said pawl pins for providing continuous rearward movement of said film carriage.

4. The combination of claim 2 wherein said single sheet of photographic film has a tab like attachment portion and a body portion;
   said tab portion having at least one registry hole;
   said protective cover being attached to said tab portion in a breakaway manner;
   said film carriage having at least one registry pin corresponding to the registry hole of said film sheet;
   said means for attaching said film sheet to said film carriage comprises said registry holes and said registry pins;
   means for removing said protective cover from said film sheet at said breakaway attachment.

5. The method of producing a microfiche comprising the steps of:
   engaging the registry holes of a film pack with corresponding registry pins of a film carriage;
   removing the protective cover from said film pack to uncover a photosensitive surface of a film sheet;
   indexing said film carriage to desired locations;
   producing images of sequential document at predetermined areas of said film sheet, as controlled by said indexing;
   transporting said film sheet from said film carriage to a film processor;
   causing said film processor to develop the images on said film sheet;
   depositing a complete microfiche in an output receptacle.

References Cited

UNITED STATES PATENTS

| 1,045,539 | 11/1912 | Folmer | 95—37 |
| 2,369,981 | 2/1945 | Reynters | 95—37 X |
| 3,488,116 | 1/1970 | Mazzio et al. | 355—10 |
| 3,584,562 | 6/1971 | Wisner | 95—13 |
| 3,586,501 | 6/1971 | Norquist et al. | 95—13 |

SAMUEL S. MATTHEWS, Primary Examiner

E. M. BERO, Assistant Examiner

U.S. Cl. X.R.

95—13, 37; 355—10